W. C. BECKWITH.
VEHICLE WHEEL.
APPLICATION FILED MAY 1, 1916.
1,243,130.
Patented Oct. 16, 1917.
2 SHEETS—SHEET 1.
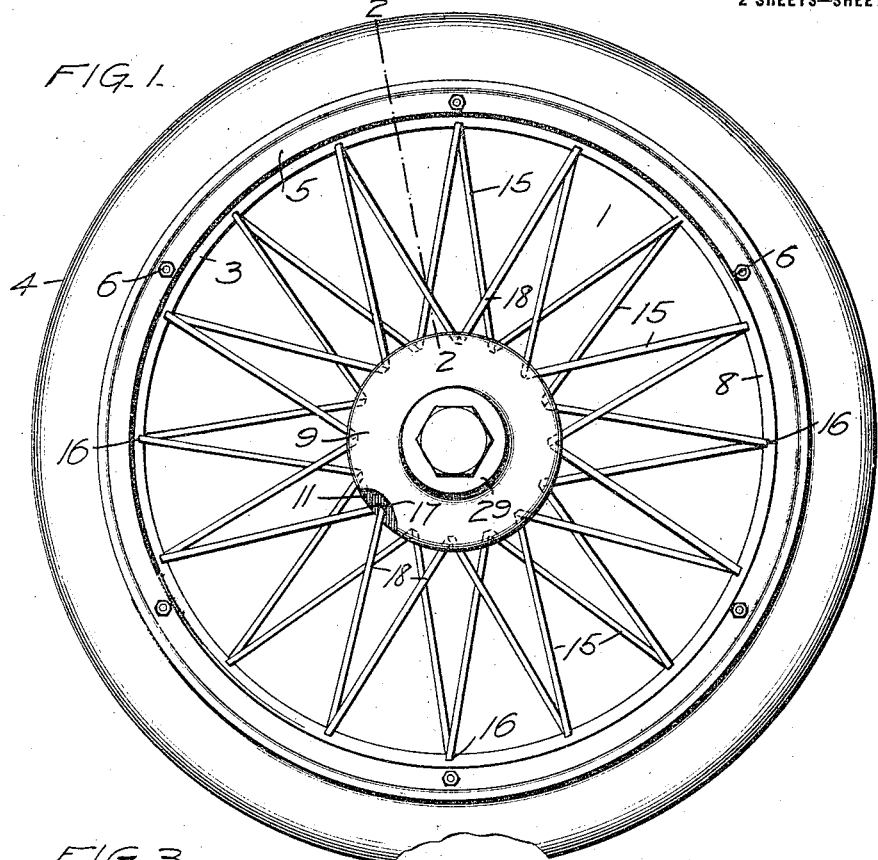
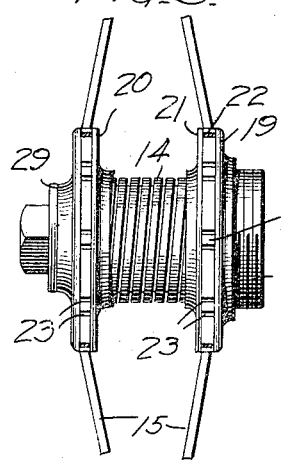
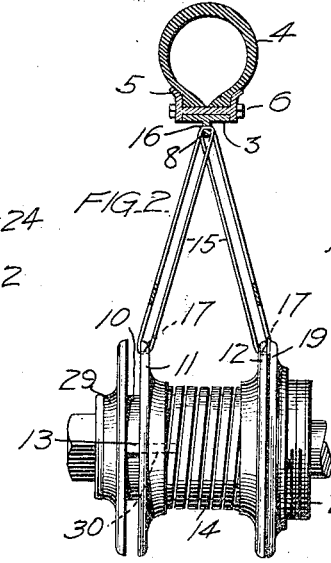
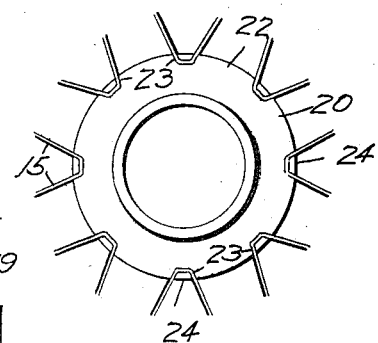

W. C. BECKWITH.
VEHICLE WHEEL.
APPLICATION FILED MAY 1, 1916.
1,243,130.
Patented Oct. 16, 1917.
2 SHEETS—SHEET 2.
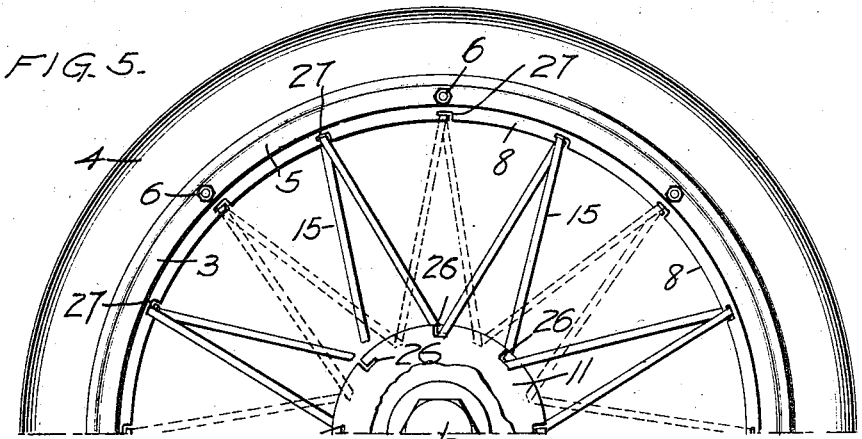
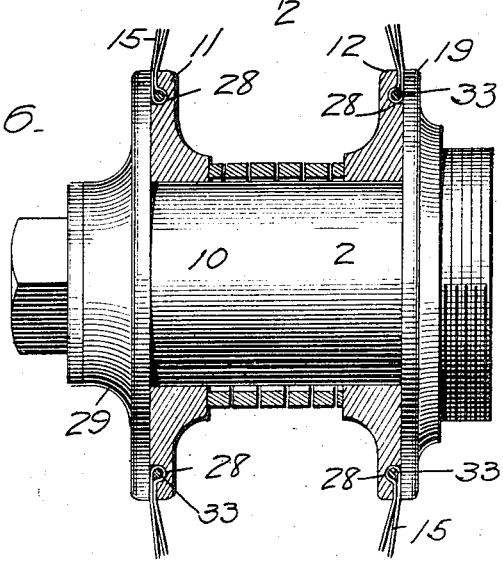
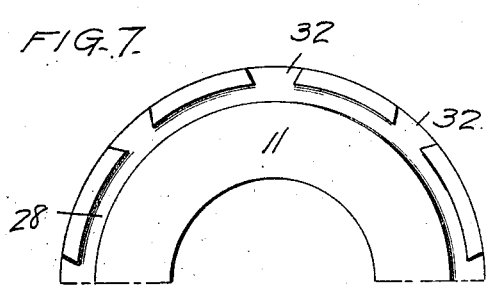
Inventor
Walter C Beckwith
By Percy H Moore
Attorney
Witness

UNITED STATES PATENT OFFICE.

WALTER C. BECKWITH, OF FOSTORIA, OHIO.

VEHICLE-WHEEL.

1,243,130.	Specification of Letters Patent.	Patented Oct. 16, 1917.

Application filed May 1, 1916. Serial No. 94,742.

*To all whom it may concern:*

Be it known that I, WALTER C. BECKWITH, a citizen of the United States, residing at Fostoria, in the county of Seneca and State of Ohio, have invented certain new and useful Improvements in Vehicle-Wheels, of which the following is a specification.

My invention relates to vehicle wheels and more particularly to resilient wheels at present used for automobiles, motorcycles, bicycles and the like.

The object of my invention is to provide a spokeless wheel which will be inexpensive to manufacture, and light in weight without sacrificing any of the advantages of the conventional spoked vehicle wheel.

The invention consists essentially of a pair of relatively slidably adjustable hub members each connected to the wheel felly by means of suitable lacing.

In the accompanying drawings, wherein I have illustrated a preferred form of the invention:

Figure 1 is a side elevation of the invention;

Fig. 2 is a section on the line 2—2 of Fig. 1;

Fig. 3 is a fragmentary section of a modified form of the invention;

Fig. 4 is a detailed elevation of one of the hub members shown in Fig. 3;

Fig. 5 is an elevation partly broken away of a modification showing the open ended slots;

Fig. 6 is a section through the hub showing a further modified form and

Fig. 7 is a detail elevational view of one of the hub members seen in Fig. 6 detached.

Referring more particularly to the drawings, in which like reference numerals indicate corresponding parts throughout the several views, 1 designates a vehicle wheel comprising a hub 2, felly 3 and pneumatic tire 4, the tire being clamped to the felly in a well known and obvious manner by means of a demountable rim 5 and bolts 6. The felly 3 is formed upon the inner periphery with a centrally disposed apertured rib 8 for a purpose hereinafter described.

The hub 2 includes a cap 29 formed with a sleeve extension 10 mounted upon which are a pair of apertured ring-like members 11 and 12. The member 12 may be slidably mounted on the sleeve but is preferably fixed thereto by any suitable means (not shown) while the member 11 is slidably adjustable, as by means of a rib 13, formed on the sleeve 11, extending within the groove 30, with which the ring-like member is provided. A coiled spring 14 normally tends to force the members 11 and 12 apart.

In lieu of the conventional wooden or metallic spokes or spring hub-supporting members heretofore used in the construction of vehicle wheels I employ an endless band or tape like member or members 15 which for convenience of description will be hereinafter referred to as tapes. These tapes which may be formed of any suitable pliable material such as fabric, cable, thin sheet metal or the like are threaded in zigzag fashion through the apertures 16 and 17, respectively formed in the rib 8 of the felly 3 and through the hub members 11 and 12. It will be noted that a pair of endless tapes 15 are employed and that the apertures 16 and 17 are placed in staggered relation, to the end that one flight or section of one of the tapes 15 will cross the adjacent flight or section of the opposing tape 15, as at 18. In this way the hub 2 is securely suspended or supported within the felly. A collar 19 threaded upon the sleeve 10 serves (as does the cap 29) to prevent the tapes from becoming accidentally detached.

In practice it has been found that the jolting and jarring incident to the passage of vehicle wheels over obstructions in the road will be greatly lessened or almost entirely obviated by properly regulating the tension or strength of the springs 14 according to the load. Any movement of the hub 2 from its normally centered position will cause a slight slackening in the tension of certain of the flights of the tape, according to the direction of the movement of the hub, which will be automatically resisted by corresponding tightening of the remaining flights. This tensioning or tightening action is of course greatly increased by the action of the spring 14 although it has been found that the principal advantage of the spring 14 is that it prevents breaking of the tape under sudden violent strains. The spring 14 may therefore be dispensed with under certain conditions and positive means (not shown) substituted for adjusting one or both of the hub members.

The modified form of invention illustrated in Fig. 3 is identical with the showing in Figs. 1 and 2 with the exception that the hub members 20 and 21 are formed with outwardly extending peripheral flanges 22, each of the flanges being provided with a plurality of pairs of spaced slots 23. The tapes 15 are looped around the portion 24 of the flanges extending between each pair of slots, as best illustrated in Fig. 4, and are then threaded through the apertures 16 in the rib 8 of the felly.

In Fig. 5 I have shown a construction wherein the rib 8 and the hub members 11 and 12 are provided with open-ended slots 26 and 27 respectively for the reception of the tape 15. This construction permits of the tape being applied after the wheel has been otherwise assembled, it being merely necessary to compress the spring 14 between the hub members 11 and 12 during this operation in order to insure a proper tensioning of the tape flights.

In the form of invention illustrated in Figs. 6 and 7 the hub members 11 and 12 are formed with circumferential grooves 28 adapted to receive clamping rings 33. The tape 15 is secured to the hub by being looped around the rings 33, notches 32 being cut in the hub members to facilitate this operation.

While I have described my invention as being particularly useful in the construction of vehicle wheels it is obvious that it is adapted for use in connection with various other devices such as pulleys, etc.

From the foregoing it will be seen that I have devised a strong, durable and thoroughly efficient wheel of the character described.

As many changes could be made in the above construction and many apparently widely different embodiments of my invention, within the scope of the claim constructed without departing from the spirit or scope thereof, it is intended that all matter contained in the accompanying specification and drawings shall be interpreted as illustrative and not in a limiting sense.

Having thus described my invention:

What I claim is:

In a vehicle wheel, a hub and felly, said hub including a pair of relatively movable members, a pair of endless pliable hub supporting tapes slidably laced to said felly and to said relatively movable members and means interposed between said relatively movable members normally forcing said relatively movable members apart, whereby strain applied to one flight of an endless tape will be communicated through all of the flights thereof to said movable member.

In testimony whereof I affix my signature in presence of two witnesses.

WALTER C. BECKWITH.

Witnesses:
P. H. MOORE,
CHARLES E. BECKWITH.

Copies of this patent may be obtained for five cents each, by addressing the "Commissioner of Patents, Washington, D. C."